United States Patent
Marupaduga (10) Patent No.: US 12,309,657 B1
(45) Date of Patent: May 20, 2025

(54) PREDICTION OF CONNECTION LOSS AS BASIS TO CONTROL PRIMARY UPLINK PATH OF DUAL-CONNECTED DEVICE

(71) Applicant: T-Mobile USA, Inc., Bellevue, WA (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 374 days.

(21) Appl. No.: 16/949,857

(22) Filed: Nov. 17, 2020

(51) Int. Cl.
*H04W 36/14* (2009.01)
*H04W 52/14* (2009.01)
*H04W 52/36* (2009.01)
*H04W 72/21* (2023.01)

(52) U.S. Cl.
CPC ......... *H04W 36/14* (2013.01); *H04W 52/146* (2013.01); *H04W 52/365* (2013.01); *H04W 72/21* (2023.01)

(58) Field of Classification Search
CPC .. H04W 36/14; H04W 72/0413; H04W 76/15
See application file for complete search history.

(56) References Cited

U.S. PATENT DOCUMENTS

| 7,433,333 | B2 | 10/2008 | Fong et al. | |
|---|---|---|---|---|
| 2016/0021585 | A1 | 1/2016 | Pedersen et al. | |
| 2016/0198374 | A1* | 7/2016 | Virtej | H04L 5/22 455/444 |
| 2018/0020386 | A1* | 1/2018 | Chandramouli | H04W 36/0027 |
| 2019/0289505 | A1 | 9/2019 | Thomas et al. | |
| 2020/0337101 | A1* | 10/2020 | Brooks | H04W 64/00 |
| 2022/0124560 | A1* | 4/2022 | Yeh | H04L 41/5025 |

OTHER PUBLICATIONS

Office Action from U.S. Appl. No. 16/949,854, dated Jun. 8, 2022.
U.S. Appl. No. 16/949,854, filed Nov. 17, 2020.
First Action Interview Pilot Program Pre-Interview Communication from U.S. Appl. No. 16/949,854, dated Dec. 29, 2021.
Office Action from U.S. Appl. No. 16/949,854, dated Feb. 11, 2022.

\* cited by examiner

*Primary Examiner* — Barry W Taylor
(74) *Attorney, Agent, or Firm* — Lee & Hayes, P.C.

(57) ABSTRACT

A method and system for controlling uplink-path switching of a user equipment device (UE) when the UE has at least two co-existing air-interface connections including a first air-interface connection with a first access node and a second air-interface connection with a second access node, and where one of the first and second air-interface connections defines a primary uplink path of the UE. An example method includes (i) predicting that the UE's second air-interface connection will be lost and (ii) responsive to at least the predicting that the UE's second air-interface connection will be lost, but before the predicted loss occurs, forgoing application of at least a portion of an uplink-path-switch control process for dynamically controlling whether to reconfigure the UE from having the first air-interface connection be set as the UE's primary uplink path to having the second air-interface connection be set as the UE's primary uplink path.

20 Claims, 4 Drawing Sheets

PREDICTION OF CONNECTION LOSS AS BASIS TO CONTROL PRIMARY UPLINK PATH OF DUAL-CONNECTED DEVICE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further, each carrier could be defined within an industry standard frequency band, by its frequency channel(s) being defined within the frequency band. Examples of such frequency bands include, without limitation, (i) bands 2, 4, 12, 25, 26, 66, 71, and 85, supporting FDD carriers (ii) band 41, supporting TDD carriers, and (iii) bands n258, n260, and n261, supporting FDD and TDD carriers.

The coverage provided by a given access node on a given carrier could also be considered to define a respective "cell". Thus, if an access node provides coverage and service on two carriers, the access node would be providing two cells, one on each carrier. And if two access nodes provide coverage and service on the same carrier as each other, the access nodes would be providing different respective cells than each other, both on the same carrier.

On the downlink and uplink, the coverage of each such cell could define an air interface configured in a specific manner to provide physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

Overview

When a UE enters into coverage of an example network, the UE could detect threshold strong coverage of an access node on a particular carrier. For instance, the UE could scan for and detect coverage of the access node on the carrier and could determine that reference signal receive power (RSRP) from the access node on that carrier is threshold high. And the UE could then engage in random-access signaling and connection signaling, such as Radio Resource Control (RRC) signaling, with the access node to establish an air-interface connection (e.g., RRC connection) through which the access node will then serve the UE on that carrier. Further, the access node could establish in data storage a context record for the UE, noting the carrier on which the UE is connected and noting associated service information.

In addition, if the UE is not already registered for service with the core network, the UE could transmit to the access node an attach request, which the access node could forward to a core-network controller for processing. And the core-network controller and access node could then coordinate setup for the UE of one or more user-plane bearers, each of which could include (i) an access-bearer portion that extends between the access node and a core-network gateway system that provides connectivity with a transport network and (ii) a data-radio-bearer (DRB) portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway system receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) scheduling directive that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI scheduling directive that designates those upcoming PRBs. And the UE could then accordingly transmit the transport block to the access node in the designated PRBs.

Further, as the industry advances from one generation of wireless technology to the next, or in other scenarios, networks and UEs may also support dual-connectivity service, where a UE is served on multiple co-existing connections, perhaps according to different respective RATs.

For instance, a network could include access nodes that provide coverage and service according to a first RAT ("first-RAT access nodes") and access nodes that provide coverage and service according to a second RAT ("second-RAT access nodes"), and a UE positioned concurrently within coverage of both a first-RAT access node and a second-RAT access node could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs, each in the manner discussed above for instance.

Such dual connectivity (or "non-standalone" (NSA) connectivity) could also help to facilitate increased peak data-rate of communications, by multiplexing the UE's communications across the multiple air-interface connections. Further or alternatively, dual connectivity may provide other benefits compared with serving a UE on a single connection (as "standalone" (SA) connectivity).

In a representative dual-connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

When the UE enters into coverage of such a system, the UE could initially scan for coverage and discover threshold strong coverage of the MN on a given carrier, and the UE could then responsively engage in signaling as discussed above to establish a first air-interface connection with the MN on that carrier and to attach with the network. Further, the MN may also add one or more additional carriers to that first air-interface connection to provide the UE with carrier-aggregation service.

In addition, perhaps having determined from profile data that the UE is dual-connectivity-capable, the MN might then coordinate setup of dual connectivity for the UE.

Coordinating setup of dual connectivity for the UE could involve first identifying an access node to be an SN for the UE, with the identifying being based on measurement reporting from the UE and/or on coverage assumptions. And coordinating setup of the dual connectivity for the UE could then involve engaging in signaling to coordinate setup for the UE of a second air-interface connection between the UE and the identified SN. For instance, the MN could engage in signaling with the SN to arrange for establishment of the second air-interface connection, and the MN could engage in signaling with the UE to cause the UE to access the SN and complete setup of that second air-interface connection. Further, this connection with the SN could likewise be configured to encompass multiple carriers.

In addition, coordinating setup of dual connectivity for the UE could also involve engaging in signaling, for each of one or more bearers established for the UE, to split the bearer so that the MN and SN can then each serve a respective portion of the UE's data communications. For instance, the MN could engage in signaling to establish a bearer split at the core-network gateway system, with one access-bearer leg extending between the gateway system and the MN and another access-bearer leg extending between the gateway system and the SN. Alternatively, the MN could engaging signaling to establish a bearer split at the MN, with the UE's access bearer remaining anchored at the MN and a branch of the access bearer extending between the MN and the SN. And still alternatively, the MN could engage in signaling to establish a bearer split at the SN, with the UE's access bearer being transferred to and anchored at the SN and a branch of the access bearer extending between the SN and the MN.

With dual-connectivity so configured by way of example, the MN and SN could then serve the UE with packet-data communications over their respective connections with the UE, each in the manner discussed above, for instance with a portion of data flowing over the UE's first air-interface connection between the UE and the MN concurrently with another portion of the data flowing over the UE's second air-interface connection between the UE and the SN.

In an example implementation, the UE's downlink user-plane data flow could be split between the UE's two connections. For instance, when the core-network gateway system has packet data destined to the UE, that data could flow over a split bearer like one of those noted above, with the MN ultimately receiving a portion of the data and transmitting that portion of data over the UE's first-RAT connection to the UE, and with the SN ultimately receiving another portion of the data and transmitting that other portion of data over the UE's second-RAT connection to the UE.

As to the uplink, however, to help conserve the UE's transmission power and battery power and/or for other reasons, the UE might be configured by default to operate in a single-connection-uplink mode in which the UE limits its uplink user-plane data flow to just one of the UE's connections, referred to as the UE's "primary uplink path". In that mode, when the UE has packet data to transmit on the transport network, the UE would transmit the data on just the UE's primary uplink path, and the data could then flow over an access bearer from the recipient access node ultimately to the core-network gateway system for output onto the transport network.

Further, upon occurrence of a trigger, such as a threshold high rate of uplink data flow from the UE, the UE could transition from the single-connection-uplink mode to a split-uplink mode in which the UE will split its uplink data flow between its connections. In the split-uplink mode, for instance, when the UE has data to transmit on the transport network, the UE could transmit a portion of that data over its first air-interface connection to the MN, and that data could flow over an access bearer from the MN ultimately to the core-network gateway system for output onto the transport network, and the UE could transmit another portion of the data over its second air-interface connection to the SN, and that data could similarly flow over an access bearer from the SN ultimately to the core-network gateway system for output onto the transport network. In addition, this uplink split could be configured to put a majority of the UE's uplink data flow on the UE's primary uplink path.

In practice, the UE's serving MN could be responsible for controlling which of the UE's connections will be the UE's primary uplink path. In an example implementation, the MN could base this control on a comparison or other consideration of performance of one or more of the UE's connections, keyed to any of various performance metrics.

Without limitation, for instance, the MN could base the control on a consideration of the UE's coverage strength, such as RSRP, respectively on either or each of the UE's connections, such as whether the UE's RSRP on one connection is higher (e.g., threshold higher) than the UE's RSRP on the other connection, or whether the UE's RSRP on a given one of the UE's connections is threshold high enough to justify that connection being the UE's primary uplink path. And the MN could then transmit to the UE an RRC message that indicates which of the UE's connections the UE should use as the UE's primary uplink path, and the UE could responsively set itself could operate accordingly.

With this arrangement, when a UE is dual connected and one of the UE's connections is set as the UE's primary uplink path, the UE's serving MN may engage in an ongoing uplink-path-switch control process to dynamically control whether to reconfigure the UE to make the UE's other connection the UE's primary uplink path. In this process, the MN could monitor for and detect when a trigger for such an uplink-path switch occurs, and the MN could respond to occurrence of that uplink-path-switch trigger by directing and thus causing the UE to switch to use the other connection as the UE's primary uplink path.

In an example implementation of this process, if the UE's connection with the MN is currently set as the UE's primary uplink path, the MN could monitor to determine when performance of the UE's connection with the SN becomes threshold good enough (e.g., threshold better than performance of the UE's connection with the MN) to justify reconfiguring the UE to instead make the UE's connection with the SN the UE's primary uplink path. And if and when the MN detects occurrence of this trigger, the MN could then transmit to the UE an RRC connection-reconfiguration message that directs and thus causes the UE to switch to use the UE's connection with the SN as the UE's primary uplink path. And the UE could responsively do so and affirmatively respond to the MN with an RRC connection-complete message.

Although this uplink-path switching might be useful and desirable as a general matter, doing so in some situations might be wasteful. One such situation is where the UE is likely to soon lose its connection with the SN.

When a UE is served with dual connectivity by an MN and an SN, the UE could lose its connection with the SN by moving to a location where RF communication between the UE and the SN is significantly degraded, blocked, or otherwise not practical. For instance, the UE could move to a location where RF communication between the UE and the SN is severely obstructed, or the UE could move to a location that is beyond the effective range of RF communication between the UE and the SN on the downlink and/or uplink. In these or other situations, the UE and SN could experience failure of communication with each other, which could represent a loss of their air-interface connection.

At a time when the dual-connected UE's connection with the MN is currently set as the UE's primary uplink path and the UE is likely to soon lose its connection with the SN, it could be a relative waste of resources for the MN to switch the UE's primary uplink path to instead be the UE's connection with the SN. Carrying out the uplink path switch in that scenario could be a waste of RRC signaling resources and processing resources, by way of example.

The present disclosure provides a technical mechanism that may help to address this.

The disclosed mechanism can apply in a scenario where a UE has dual connectivity with at least an MN and an SN, where the UE's connection with the MN is set as the UE's primary uplink path, and where the MN is configured to apply an uplink-path-switch control process for dynamically controlling whether to reconfigure the UE to instead make the UE's connection with the SN the UE's primary uplink path. In that scenario, (i) the MN could determine that the UE is headed to a location where the UE will lose its connection with the SN, and (ii) in response to making that determination, but before the UE loses its connection with the SN, the MN could proactively forgo application of at least a portion of the uplink-path-switch control process.

For instance, in response to determining that that the UE is headed to a location where the UE will lose its connection with the SN, but before the UE loses its connection with the SN, the MN could discontinue the MN's process of monitoring to detect the occurrence of an uplink-path-switch trigger for triggering an uplink-path switch for the UE, so as to avoid making the UE's connection with the SN the UE's primary uplink path. And/or in response to determining that that the UE is headed to a location where the UE will lose its connection with the SN, but before the UE loses its connection with the SN, the MN could forgo reconfiguring the UE to make the UE's connection with the SN the UE's primary uplink path, even if and when the MN detects occurrence of an uplink-path-switch trigger for doing so.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations, including possibly single-RAT dual connectivity and/or dual-connectivity encompassing more than two connections. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
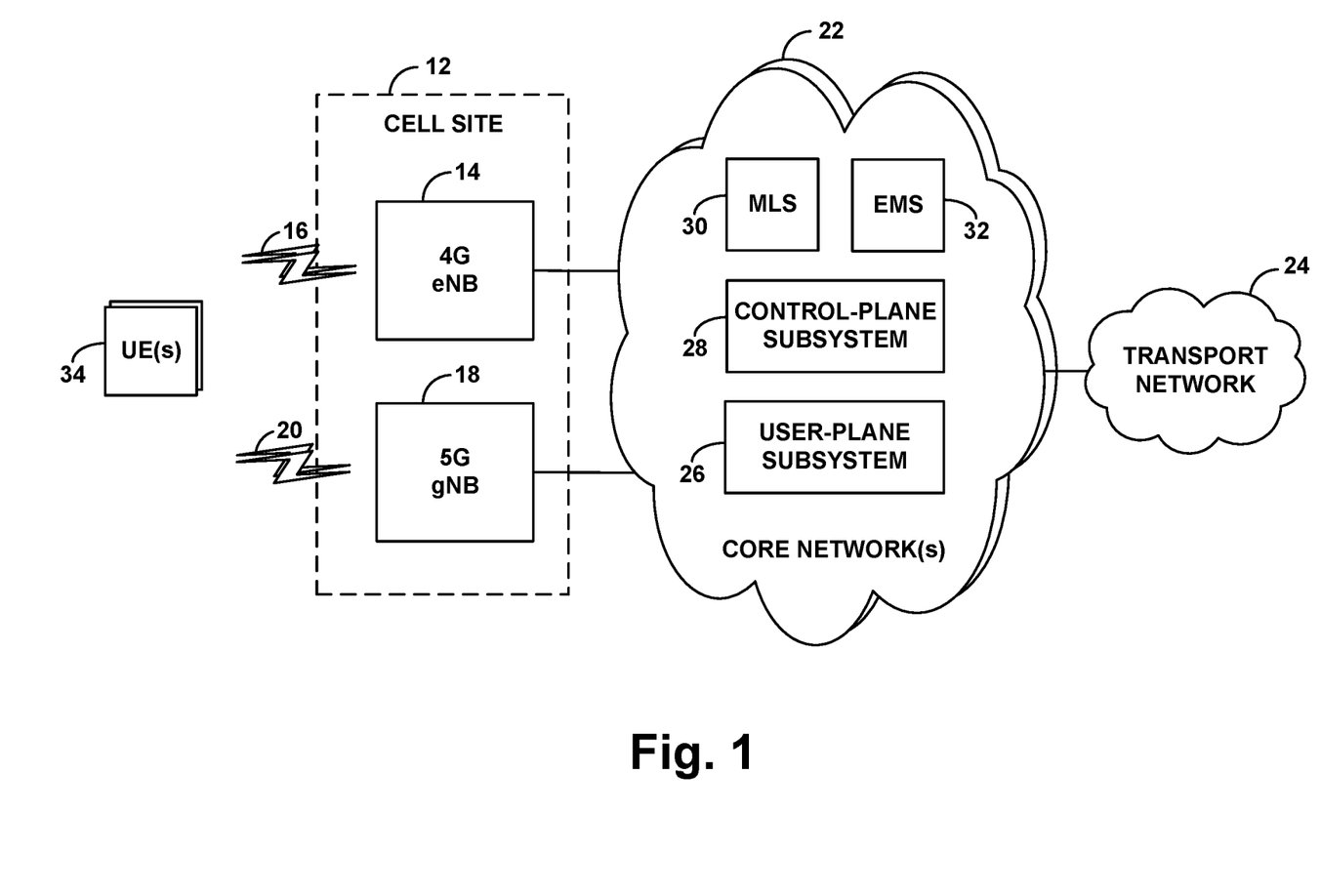
FIG. 1 is a simplified block diagram of an example wireless network arrangement in which various disclosed features can be implemented.

Referring to the drawings, FIG. 1 depicts an example network having a cell site 12 including a 4G eNB 14 that is configured to provide 4G service on each of one or more 4G carriers 16 and an example 5G gNB 18 that is configured to provide 5G service on each of one or more example 5G carriers 20.

Each of these access nodes could be a macro access node of the type configured to provide a wide range of coverage or could take other forms, such as a small cell access node, a relay node, a femtocell access node, or the like, which might be configured to provide a smaller range of coverage, among other possibilities. Further, these access nodes could share some equipment, such as an antenna tower and antenna array or the like, and could be configured to provide coverage in largely the same direction as each other, to define an area in which UEs can engage in both 4G service provided by the 4G eNB 14 and 5G service provided by 5G gNB 18.

In representative 4G and 5G implementations, each carrier could be FDD or TDD and could be defined in a given band such as one of those noted above. If a carrier is FDD, the carrier would have separate downlink and uplink channels, and each of these channels would have a respective center frequency and a respective bandwidth. Whereas, if a carrier is TDD, the carrier would have a single channel with a center frequency and bandwidth, and the access node could configure the air-interface on the carrier to have a particular downlink-uplink configuration that establishes what percentage of time the carrier will be downlink versus uplink.

Further, the air interface on each such channel could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In practice, each access node could be interfaced with one or more core networks 22 that provide connectivity with an external transport network 24 such as the Internet for instance. Further, separate core networks could be provided for 4G and 5G use, such as one to support standalone-4G service and EN-DC service and another to support standalone-5G service. Each such core network could be a packet-switched network that supports virtual-packet tunnels or other interfaces between network nodes.

The example core network(s) 22 could include one or more user-plane subsystems 26 through which UE bearer communications could flow to and from the transport network 24, and one or more control-plane subsystems 28 supporting functions such as UE attachment, authentication, mobility management, and bearer management, among others.

Further, the example core network(s) 22 could also include one or more mobile location systems (MLSs) 30 and one or more element management systems (EMSs) 32. An example MILS could be a computing-system platform configured to determine (e.g., track) geographic location of UEs using techniques such as trilateration, multilateration (e.g., observed time difference of arrival (OTDOA)), satellite-based positioning, or the like. And an example EMS could be a computing-system platform configured to operate as a central repository of operational data for the wireless communication network and to control and manage operation of various network elements.

FIG. 1 also depicts various example UEs 34 that may from time to time be within coverage of the 4G and 5G access nodes and may from time to time be served by the access nodes. Each of these UEs could take any of the forms noted above, among other possibilities. Further, some or all these UEs could be equipped with a 4G LTE radio and/or a 5G NR radio, and could have associated circuitry and logic to support 4G LTE service and/or 5G NR service, and perhaps EN-DC service.

Upon entering into coverage this example system, a representative such UE could scan for and discover coverage of a given access node and could then responsively engage in signaling to connect with the access node as discussed above.

For instance, if the UE supports just 4G service or if the UE supports EN-DC service, the UE might initially scan for 4G coverage and discover threshold strong coverage of 4G eNB 14 on a 4G carrier 16, and the UE may then responsively engage in random access and RRC signaling with the 4G eNB 14 to establish a 4G connection between the UE and the 4G eNB 14 on that carrier. Further, the 4G eNB 14 may add one or more other 4G carriers 16 to the UE's 4G connection to provide the UE with 4G carrier-aggregation service.

Whereas, if the UE supports just 5G service, the UE might initially scan for 5G coverage and discover threshold strong coverage of the 5G gNB 18 on a 5G carrier 20, and the UE may then responsively engage in random access and RRC signaling with the 5G gNB 18 to establish a 5G connection between the UE and the 5G gNB 18 on that carrier. And the 5G gNB 18 could likewise add one or more other 5G carriers 20 to the UE's 5G connection to provide the UE with 5G carrier-aggregation service.

Once the UE is connected with an access node, the UE may then further transmit to the access node an attach request message, which the access node may forward to a core-network controller in a core-network control-plane subsystem 28, to trigger setup for the UE one or more user-plane bearers as noted above. Further, the access node could establish in data storage a context record for the UE as noted above, and the access node could then serve the UE with packet-data communications over the UE's connection as discussed above.

In addition, when a UE connects with an access node, and/or at other times, the access node may obtain capability data that indicates various capabilities of the UE, such as whether the UE is dual-connectivity (e.g., EN-DC) capable. For instance, the access node could obtain this capability data from the UE and/or from the core-network controller. And the access node could store the capability data in the UE context record for reference while serving the UE.

For each such EN-DC capable UE that connects with the 4G eNB 14, the 4G eNB 14, operating as MN, could then work to configure EN-DC service for the UE.

For instance, first the 4G eNB 14 could first determine that the UE is within threshold strong coverage of the 5G gNB 18 on one or more 5G carriers 20, perhaps based on measurement reporting from the UE or based on coverage assumptions. And the 4G eNB 14 could then engage in signaling to configure for the UE a secondary 5G connection with the 5G gNB 18 on the one or more 5G carriers. For example, the 4G eNB 14 could transmit to the 5G gNB 18 an SN-Addition request to cause the 5G gNB 18 to allocate resources for a 5G connection for the UE on the one or more 5G carriers 18, the 4G eNB 14 could receive an SN-Addition-Request acknowledge message from the 5G gNB 18, and the 4G eNB 14 could engage in associated RRC signaling with the UE, in response to which the UE could then access and complete establishment of the 5G connection. Further, the 4G eNB 14 could engage in signaling to establish a split bearer, such to transfer the UE's access bearer to the 5G gNB 18 and to arrange for a bearer split at the 5G gNB 18.

With EN-DC service configured for the UE, the 4G eNB 14 and 5G gNB 18 could then concurrently serve the UE, each over its respective connection with the UE and each in the manner discussed above. For instance, when either access node receives data for transmission to the UE over the UE's connection with the access node, the access node could schedule and engage in transmission of the data in downlink PRBs from the access node to the UE. And when the UE has data to transmit to either access node over the UE's connection with the access node, the access node could schedule and the UE could engage in transmission of the data in uplink PRBs from the UE to the access node.

Further, when the UE is EN-DC-connected, the UE's data flow could be split between the UE's 4G and 5G connections as discussed above. For instance, when user-plane data arrives from the transport network 24 for transmission to the UE, that data may flow over a split access bearer, and the 4G eNB 14 may transmit a portion of the data over the UE's 4G connection to the UE, while the 5G gNB 18 may transmit another portion of the data over the UE's 5G connection to the UE. And when the UE has user-plane data to transmit on the transport network 24, the UE may transmit a portion of the data over its 4G connection to the 4G eNB 14, which may forward the data over an access bearer for transmission directly or indirectly through the core network 22 to the transport network 24, and the UE may transmit another portion of the data over its 5G connection to the 5G gNB 18, which may likewise forward the data over an access bearer for transmission directly or indirectly through the core network 22 to the transport network 24.

In addition, the UE could be set to treat one of the UE's connections as the UE's primary uplink path as discussed above, restricting the UE's uplink data flow to that connection until the level of data flow rises to a threshold level or other reason exists to offload some of the data flow to the UE's other connection, and/or providing a majority of the UE's uplink data flow on that connection in a split-uplink mode of operation.

In line with the discussion above, the 4G eNB 14, as the UE's MN, could control which of the UE's connections is set as the UE's primary uplink path. Upon initial establishment of EN-DC for the UE, the UE might default to use a particular one of the UE's connections (e.g., the UE's 5G connection) as the UE's primary uplink path, or the 4G eNB 14 may decide by default or based on one or more factors which of the UE's connections should be the UE's primary uplink path and may instruct and thus cause the UE to operate accordingly. Further, as discussed above, while the UE is served with EN-DC, the 4G eNB 14 could then apply an uplink-path-switch control process as discussed above, to dynamically control which of the UE's connections will be set as the UE's primary uplink path.

Without limitation, as discussed above, an example uplink-path-switch control process could involve the 4G eNB 14 monitoring performance of either or both of the UE's connections and determining based on the monitored performance whether to direct the UE to switch the UE's primary uplink path from the connection currently set as the UE's primary uplink path to the UE's other connection. In particular, the 4G eNB 14 could monitor to detect when an uplink-path-switch trigger occurs and, in response to occurrence of that uplink-path-switch trigger, could then transmit to the UE and RRC connection-reconfiguration message that directs and thus causes the UE to engage in the uplink path switch, in response to which the UE could then accordingly switch its primary uplink path and then affirmatively respond to the 4G eNB 14 with an RRC connection-complete message.

Further, as noted above, the performance at issue could relate to coverage strength, such as RSRP. For example, an uplink-path-switch trigger could be that the UE's RSRP on the connection that is not currently set as the UE's primary uplink path is threshold higher than the UE's RSRP on the connection currently set as the UE's primary uplink path. Or an uplink-path-switch trigger could be that the UE's RSRP on the connection currently set as the UE's primary uplink path is threshold low or that the UE's RSRP on the connection not currently set as the UE's primary uplink path is threshold high. Other uplink-path-switch triggers, whether or not RSRP related, could be considered as well.

With the arrangement discussed so far, the 5G gNB 18 may from time to time serve various UEs through air-interface connections between the UEs and the 5G gNB 18. For instance, the 5G gNB 18 may serve some UEs with standalone-5G service, such as where UEs connect directly with the 5G gNB 18. And the 5G gNB 18 may serve some UEs as part of EN-DC, where UEs connect initially with the 4G eNB 14, and the 4G eNB 14 works to establish EN-DC connectivity for the UEs.

When the 5G gNB 18 is serving any such UE over a 5G air-interface connection between the UE and the 5G gNB 18, the UE may at some point lose that 5G connection. As noted above, that connection loss could occur as a result of the UE moving to a location where RF communication between the UE and the SN is severely obstructed or to a location that is beyond the effective range of that RF communication. Further, the UE and/or the 5G gNB 18 could detect the occurrence of such a connection loss by detecting a failure of their communication with each other, perhaps a sufficiently persistent such failure.

For present purposes or otherwise, a computing system could track the geographic locations (e.g., latitude/longitude positions) at which UEs are individually positioned when the UEs lose their 5G connections with the 5G gNB 18. And the computing system could use those tracked geographic locations as a basis to identify a geographic "drop zone" where UEs tend to lose their 5G connections with the 5G gNB 18. In turn, the computing system could then track movement of a given UE that is connected with the 5G gNB 18 and could predict based on that tracking that the UE is headed toward the drop zone and thus that the UE will soon lose the UE's connection with the 5G gNB 18. In practice, the computing system that carries out these operations could encompass any of various entities discussed above, such as the 4G eNB 14, the 5G gNB 18, an MLS 30, an EMS 32, and/or the UEs, among other possibilities.

The computing system could operate in various ways to track the geographic locations at which UEs are individually positioned when they lose their connections with the 5G gNB 18.

As a non-limiting example, using any of the location-determination techniques noted above or others, an MLS 30 could regularly track the location of each UE connected with the 5G gNB 18, and the MLS 30 could record that location data in correlation with timestamps and UE identifications. And on each occurrence of a loss of 5G connection with the 5G gNB 18, the 5G gNB 18 could report to an EMS 32 the connection loss in correlation with a connection-loss timestamp and associated UE identification. Or for an EN-DC-connected UE that loses its 5G connection with the 5G gNB 18, the UE or 5G gNB 18 could report the connection loss to the 4G eNB 14, and the 4G eNB 14 could report that information the EMS 32.

The EMS 32 could use the timestamp and UE-identification information to correlate this connection-loss data with the MLS-tracked location data, in order to determine locations where UEs were individually positioned when they lost their connections with the 5G gNB 18. Further, the EMS 32 could apply a clustering algorithm or the like to those determined connection-loss locations in order to identify at least one drop zone as a geographic area, perhaps defined as a polygon with geolocations as vertices, representing where UEs tend to be located when they lose their connections with the 5G gNB 18. And the EMS 32 could store this drop-zone definition and/or make the drop-zone definition available for reference by one or more other entities.

In practice, when a given UE is EN-DC-connected with the 4G eNB 14 and the 5G gNB 18, the computing system could then use this drop-zone information as a basis to predict that the UE will lose its 5G connection with the 5G gNB 18. By way of example, using techniques like those discussed above, the computing system could track the geographic location of that UE over time. And comparing the UE's tracked geographic location over time to the geographic drop-zone definition, the computing system could determine that the UE is headed toward the drop zone. Further, the computing system could determine, based at least on the UE's speed of movement and the UE's location path, that the UE is likely to soon arrive at the drop zone—perhaps that the UE will reach the drop zone within a threshold short upcoming time, with the threshold being predefined by engineering design or another process.

In an example implementation, one or more of various entities as noted above could carry out this process to predict that the UE is headed toward the drop zone. Further, if an entity that carries out this process is other than the 4G eNB 14, the entity could alert the 4G eNB 14 upon determining that the UE will soon arrive at the drop zone and thus that the UE is likely to soon lose the UE's 5G connection with the 5G gNB 18.

In line with the discussion above, the 4G eNB 14 could optimally make use of this or another prediction that the EN-DC-connected UE will lose the UE's connection with the 5G gNB 18, as a basis to govern application of the uplink-path-switch control process.

For instance, as noted above, in a scenario where the UE's 4G connection with the 4G eNB 14 is currently set as the UE's primary uplink path, and where the 4G eNB 14 would apply the uplink-path-switch control process to control whether to reconfigure the UE to instead make the UE's 5G connection with the 5G gNB 18 the UE's primary uplink path, the 4G eNB 14 could respond to at least this prediction by forgoing application of at least a portion of that uplink-path-switch control process.

By way of example, in response to at least predicting that the UE will lose the UE's connection with the 5G gNB 18, but before that predicted connection loss occurs (whether or not that connection loss ultimately occurs), the 4G eNB 14 could stop monitoring to detect occurrence of an uplink-path-switch trigger for reconfiguring the UE to have the UE's connection with the 5G gNB 18 be the UE's primary uplink path.

Alternatively or additionally, in response to at least predicting that the UE will lose the UE's connection with the 5G gNB 18, but before that predicted connection loss occurs (again, whether or not that connection loss ultimately occurs), the 4G eNB 14 could otherwise forgo directing the UE to switch the UE'S primary uplink path to be the UE's 5G connection. For instance, even if the 4G eNB 14 detects the occurrence of an uplink-path-switch trigger for triggering that uplink-path switch for the UE, the 4G eNB 16 could forgo responsively directing the UE to engage in that uplink-path switch. Other examples may be possible as well.

Figure 2:
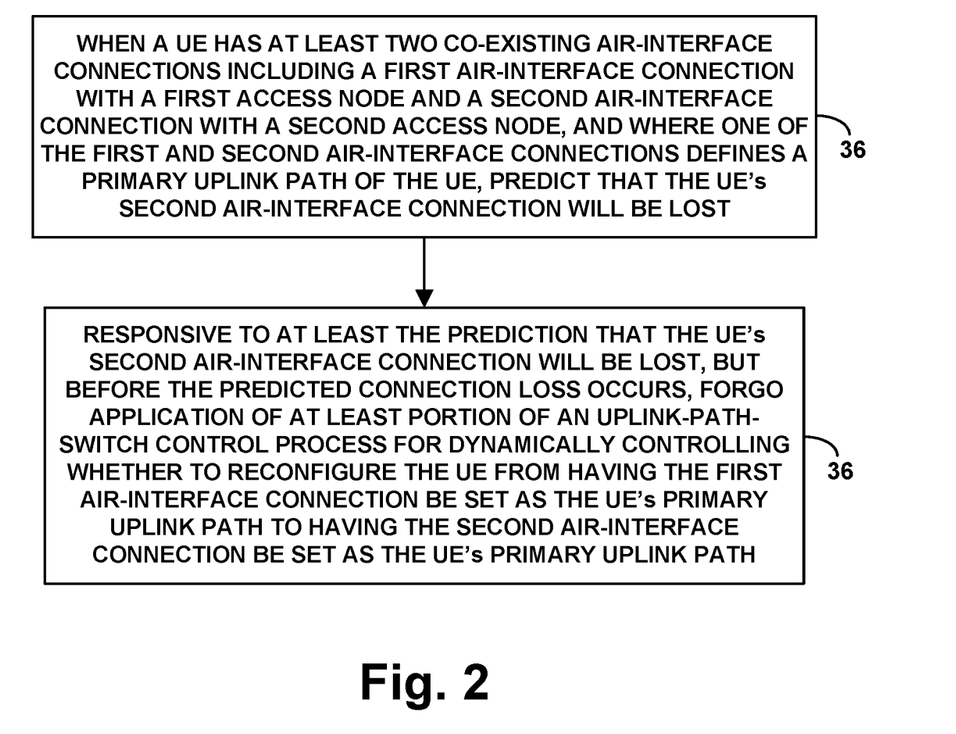
FIG. 2 is a flow chart depicting an example method in accordance with the disclosure.

FIG. 2 is a flow chart depicting a method that could be carried out in accordance with the present disclosure to control uplink-path switching of a UE when the UE has at least two co-existing air-interface connections including a first air-interface connection with a first access node and a second air-interface connection with a second access node, and where one of the first and second air-interface connections defines a primary uplink path of the UE. And as noted above, these air-interface connections could operate according to different RATs than each other, such as one being a 4G LTE connection and the other being a 5G NR connection, among other possibilities.

As shown in FIG. 2, at block 36, the method includes predicting that the UE's second air-interface connection will be lost. And at block 38, the method includes, responsive to at least the predicting that the UE's second air-interface connection will be lost, but before the predicted loss occurs (whether or not it ultimately occurs), forgoing application of at least a portion of an uplink-path-switch control process for dynamically controlling whether to reconfigure the UE from having the first air-interface connection be set as the UE's primary uplink path to having the second air-interface connection be set as the UE's primary uplink path.

In line with the discussion above, the air-interface connection that defines the primary uplink path of the UE could be the connection to which the UE restricts its uplink user-plane transmission from the UE unless and until a trigger condition causes the UE to split the uplink user-plane transmission between the first and second air-interface connections, and/or could be the connection on which the UE provides a majority of the UE's uplink user-plane communication.

Further, as discussed above, the act of predicting that the UE's second air-interface connection will be lost could involve predicting that the UE's second air-interface connection will be lost threshold soon. And the act of forgoing application of at least the portion of the uplink-path-switch control process responsive to at least the predicting that the UE's second air-interface connection will be lost could involve forgoing application of at least the portion of the uplink-path-switch control process responsive to at least the predicting that the UE's second air-interface connection will be lost threshold soon.

In addition, the act of predicting that the UE's second air-interface connection will be lost could be based on geolocation tracking of the UE in relation to a geographic drop zone representing where UEs having air-interface connections with the second access node have lost the connections.

Further, as discussed above, the uplink-path-switch control process could involve (i) monitoring to detect occurrence of an uplink-path-switch trigger for the reconfiguring of the UE from having the first air-interface connection be set as the UE's primary uplink path to having the second air-interface connection be set as the UE's primary uplink path and (ii) responsive to detecting occurrence of the uplink-path-switch trigger, reconfiguring the UE from having the first air-interface connection be set as the UE's primary uplink path to having the second air-interface connection be set as the UE's primary uplink path. And the act of forgoing application of at least a portion of the uplink-path-switch control process for dynamically controlling whether to reconfigure the UE from having the first air-interface connection be set as the UE's primary uplink path to having the second air-interface connection be set as the UE's primary uplink path could involve (i) discontinuing the monitoring and/or (ii) forgoing the reconfiguring even if the uplink-path-switch trigger occurs.

Figure 3:
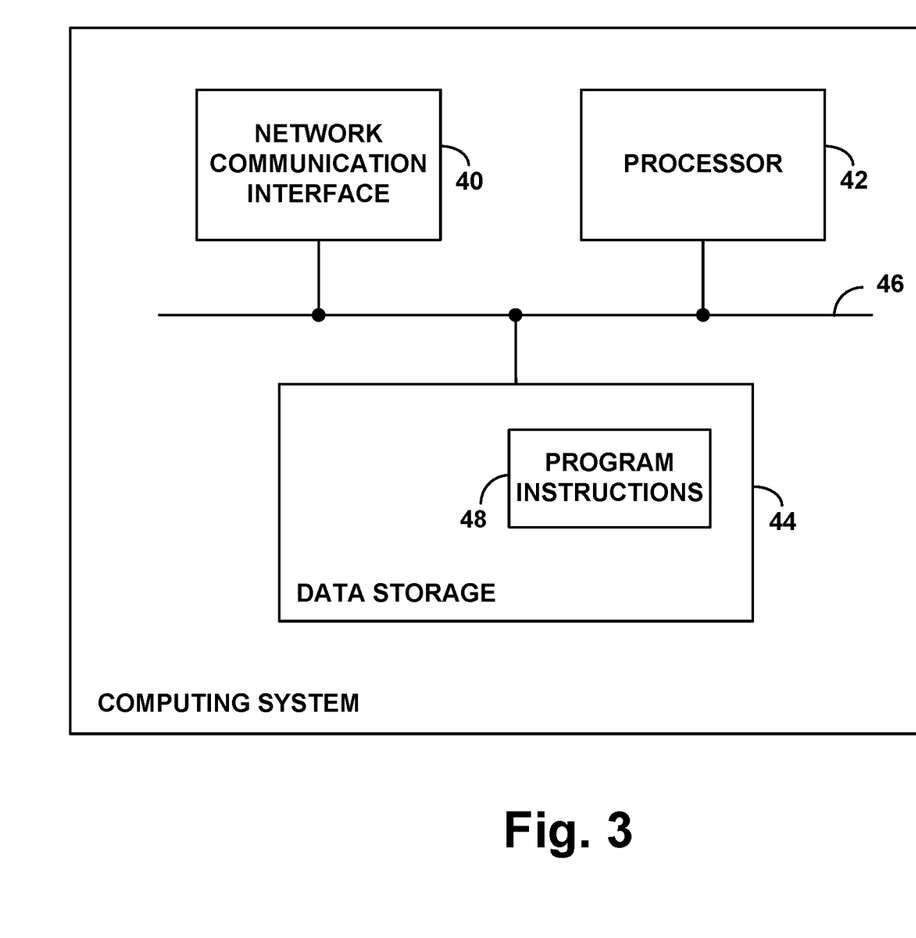
FIG. 3 is a simplified block diagram of an example computing system operable in accordance with the disclosure.

FIG. 3 is next a simplified block diagram of an example computing system that could be operable in accordance with the present disclosure to control uplink-path switching of a UE when the UE has at least two co-existing air-interface connections including a first air-interface connection with a first access node and a second air-interface connection with a second access node, and where one of the first and second air-interface connections defines a primary uplink path of the UE. As noted above, such a computing system could be provided at or more of the entities shown in FIG. 1, among other possibilities.

As shown in FIG. 3, the example computing system includes at least one network communication interface 40, at least one processor 42, and at least one non-transitory data storage 44, which could be integrated together and/or interconnected by a system bus, network, or other connection mechanism 46.

The at least one network communication interface 40 could comprise a physical network connector (e.g., an Ethernet interface) and associated communication logic (e.g., protocol stacks) to facilitate wired or wireless network communication with various other entities. The at least one processor 42 could comprise one or more general purpose processors (e.g., microprocessors) and/or one or more specialized processors (e.g., application specific integrated circuits). And the at least one non-transitory data storage 44 could comprise one or more volatile and/or non-volatile storage components (e.g., magnetic, optical, or flash storage, necessarily non-transitory).

As shown, the at least one non-transitory data storage 44 could then store program instructions 48. These program instructions could be executable by the at least one processor 42 to cause the computing system to carry out various operations described herein, including but not limited to the operations discussed above in relation to FIG. 2.

Various other features discussed herein can be implemented in this context as well, and vice versa.

Figure 4:
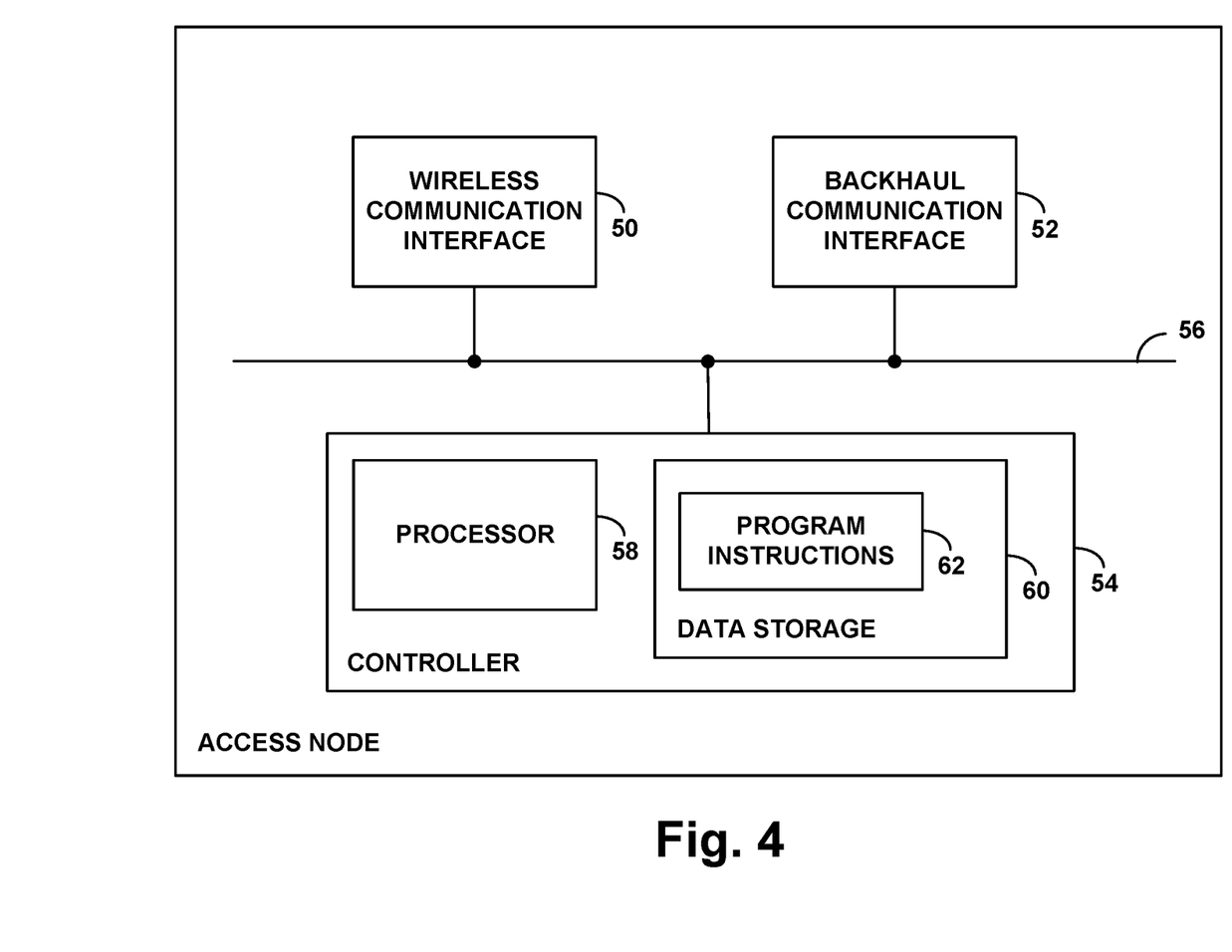
FIG. 4 is a simplified block diagram of an example access node operable in accordance with the disclosure.

FIG. 4 is next a simplified block diagram of an example first access node that could be operable in accordance with the present disclosure to control uplink-path switching of a UE when the UE has at least two co-existing air-interface connections including a first air-interface connection with the first access node and a second air-interface connection with a second access node, and where one of the first and second air-interface connections defines a primary uplink path of the UE.

As shown in FIG. 4, the example first access node includes at least one wireless communication interface 50, at least one backhaul communication interface 52, and at least one controller 54, all of which could be integrated together and/or communicatively linked together by a system bus, network, or other connection mechanism 56.

In an example implementation, the at least one wireless communication interface 50 could comprise an antenna structure, which could be tower mounted or could take other forms, and associated components such as a power amplifier and a wireless transceiver, so as to facilitate providing coverage on one or more carriers and serving the UE over the first air-interface connection. And the at least one backhaul communication interface 52 could comprise network communication interface such as an Ethernet interface, through which the first access node engages in backhaul communication.

Further, the at least one controller 54 could comprise at least one processor 58 (e.g., one or more general purpose processors and/or one or more specialized processors) programmed to cause the first access node to carry out various operations such as those discussed herein. For instance, the at least one controller 54 could comprise at least one non-transitory data storage 60 (e.g., one or more magnetic, optical, or flash storage components, necessarily non-transitory) which could store program instructions 62 executable by the at least one processor to cause the first access node to carry out such operations.

Various other features discussed herein can be implemented in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for controlling uplink-path switching of a user equipment device (UE) when the UE has at least two co-existing air-interface connections including a first air-interface connection with a first access node and a second air-interface connection with a second access node, wherein one of the first and second air-interface connections defines a primary uplink path of the UE, the method comprising:
receiving multiple indications from multiple UEs that a connection loss occurred to each of the multiple UEs at a geographic location, the multiple indications including respective timestamps associated with individual ones of connection losses and respective UE identifiers associated with individual ones of the multiple UEs;
identifying the geographic location as a drop zone based at least in part on receiving the multiple indications;
predicting that the UE's second air-interface connection will be lost based at least in part on determining that the UE is approaching the drop zone; and
responsive to at least the predicting that the UE's second air-interface connection will be lost, but before the predicted loss occurs, forgoing application of at least a portion of an uplink-path-switch control process for dynamically controlling whether to reconfigure the UE from having the first air-interface connection be set as the UE's primary uplink path to having the second air-interface connection be set as the UE's primary uplink path.

2. The method of claim 1, wherein the UE restricts, to the one air-interface connection defining the UE's primary uplink path, uplink user-plane transmission from the UE unless and until a trigger condition causes the UE to split the uplink user-plane transmission between the first and second air-interface connections.

3. The method of claim 1, wherein the method is carried out at least in part by the first access node.

4. The method of claim 1,
wherein predicting that the UE's second air-interface connection will be lost comprises predicting that the UE's second air-interface connection will be lost threshold soon, and
wherein forgoing application of at least the portion of the uplink-path-switch control process responsive to at least the predicting that the UE's second air-interface connection will be lost comprises forgoing application of at least the portion of the uplink-path-switch control process responsive to at least the predicting that the UE's second air-interface connection will be lost threshold soon.

5. The method of claim 1,
wherein the uplink-path-switch control process comprises (i) monitoring to detect occurrence of an uplink-path-switch trigger for the reconfiguring of the UE from having the first air-interface connection be set as the UE's primary uplink path to having the second air-interface connection be set as the UE's primary uplink path and (ii) responsive to detecting occurrence of the uplink-path-switch trigger, reconfiguring the UE from having the first air-interface connection be set as the UE's primary uplink path to having the second air-interface connection be set as the UE's primary uplink path, and
wherein forgoing application of at least a portion of the uplink-path-switch control process for dynamically controlling whether to reconfigure the UE from having the first air-interface connection be set as the UE's primary uplink path to having the second air-interface connection be set as the UE's primary uplink path comprises discontinuing the monitoring.

6. The method of claim 1,
wherein the uplink-path-switch control process comprises (i) monitoring to detect occurrence of an uplink-path-switch trigger for the reconfiguring of the UE from having the first air-interface connection be set as the UE's primary uplink path to having the second air-interface connection be set as the UE's primary uplink path and (ii) responsive to detecting occurrence of the uplink-path-switch trigger, reconfiguring the UE from having the first air-interface connection be set as the UE's primary uplink path to having the second air-interface connection be set as the UE's primary uplink path, and
wherein forgoing application of at least a portion of the uplink-path-switch control process for dynamically controlling whether to reconfigure the UE from having the first air-interface connection be set as the UE's primary uplink path to having the second air-interface connection be set as the UE's primary uplink path comprises forgoing the reconfiguring even if the uplink-path-switch trigger occurs.

7. The method of claim 1, wherein the first air-interface connection and second air-interface connection operate according to different radio access technologies than each other.

8. The method of claim 1, wherein receiving the multiple indications includes on each occurrence of a loss of 5G connection with a 5G gNB, the 5G gNB reporting to an element management systems (EMS) the connection loss in correlation with a connection-loss timestamp and associated UE identification.

9. The method of claim 1, wherein receiving the multiple indications includes on each occurrence of a loss of 5G connection with a 5G gNB and an EN-DC-connected UE, the UE reporting the connection loss to a 4G eNB and the 4G eNB reporting the connection loss to an EMS.

10. The method of claim 1, wherein identifying the drop zone includes correlating connection-loss data with location data using the respective timestamps and UE identifiers to determine locations where individual UEs of the multiple UEs were individually positioned when they experienced connection loss.

11. A computing system configured to control uplink-path switching of a user equipment device (UE) when the UE has at least two co-existing air-interface connections including a first air-interface connection with a first access node and a second air-interface connection with a second access node, wherein one of the first and second air-interface connections defines a primary uplink path of the UE, the computing system comprising:

at least one processor;
    at least one non-transitory data storage; and
    program instructions stored in the at least one non-transitory data storage and executable by the at least one processor to cause the computing system to carry out operations including:
receiving multiple indications from multiple UEs that a connection loss occurred to each of the multiple UEs at a geographic location, the multiple indications including respective timestamps associated with individual ones of connection losses and respective UE identifiers associated with individual ones of the multiple UEs;
identifying the geographic location as a drop zone based at least in part on receiving the multiple indications;
predicting that the UE's second air-interface connection will be lost based at least in part on determining that the UE is approaching the drop zone, and
responsive to at least the predicting that the UE's second air-interface connection will be lost, but before the predicted loss occurs, forgoing application of at least a portion of an uplink-path-switch control process for dynamically controlling whether to reconfigure the UE from having the first air-interface connection be set as the UE's primary uplink path to having the second air-interface connection be set as the UE's primary uplink path.

12. The computing system of claim 11, wherein the UE restricts, to the one air-interface connection defining the UE's primary uplink path, uplink user-plane transmission from the UE unless and until a trigger condition causes the UE to split the uplink user-plane transmission between the first and second air-interface connections.

13. The computing system of claim 11, wherein the computing system is at least partially at the first access node.

14. The computing system of claim 11,
    wherein predicting that the UE's second air-interface connection will be lost comprises predicting that the UE's second air-interface connection will be lost threshold soon, and
    wherein forgoing application of at least the portion of the uplink-path-switch control process responsive to at least the predicting that the UE's second air-interface connection will be lost comprises forgoing application of at least the portion of the uplink-path-switch control process responsive to at least the predicting that the UE's second air-interface connection will be lost threshold soon.

15. The computing system of claim 11,
    wherein the uplink-path-switch control process comprises (i) monitoring to detect occurrence of an uplink-path-switch trigger for the reconfiguring of the UE from having the first air-interface connection be set as the UE's primary uplink path to having the second air-interface connection be set as the UE's primary uplink path and (ii) responsive to detecting occurrence of the uplink-path-switch trigger, reconfiguring the UE from having the first air-interface connection be set as the UE's primary uplink path to having the second air-interface connection be set as the UE's primary uplink path, and
    wherein forgoing application of at least a portion of the uplink-path-switch control process for dynamically controlling whether to reconfigure the UE from having the first air-interface connection be set as the UE's primary uplink path to having the second air-interface connection be set as the UE's primary uplink path comprises discontinuing the monitoring.

16. The computing system of claim 11,
    wherein the uplink-path-switch control process comprises (i) monitoring to detect occurrence of an uplink-path-switch trigger for the reconfiguring of the UE from having the first air-interface connection be set as the UE's primary uplink path to having the second air-interface connection be set as the UE's primary uplink path and (ii) responsive to detecting occurrence of the uplink-path-switch trigger, reconfiguring the UE from having the first air-interface connection be set as the UE's primary uplink path to having the second air-interface connection be set as the UE's primary uplink path, and
    wherein forgoing application of at least a portion of the uplink-path-switch control process for dynamically controlling whether to reconfigure the UE from having the first air-interface connection be set as the UE's primary uplink path to having the second air-interface connection be set as the UE's primary uplink path comprises forgoing the reconfiguring even if the uplink-path-switch trigger occurs.

17. The computing system of claim 11, wherein the first air-interface connection and second air-interface connection operate according to different radio access technologies than each other.

18. A first access node operable to control uplink-path switching of a user equipment device (UE) when the UE has at least two co-existing air-interface connections including a first air-interface connection with the first access node and a second air-interface connection with a second access node, wherein one of the first and second air-interface connections defines a primary uplink path of the UE, the first access node comprising:
    at least one wireless communication interface including an antenna structure through which to serve the UE over the first air-interface connection;
    at least one backhaul communication interface through which to engage in backhaul communication; and
    at least one controller, wherein the at least one controller is configured to cause the first access node to carry out operations including:
        receiving multiple indications from multiple UEs that a connection loss occurred to each of the multiple UEs at a geographic location, the multiple indications including respective timestamps associated with the connection loss and respective UE identifiers associated with individual ones of connection losses of the multiple UEs;
        identifying the geographic location as a drop zone based at least in part on receiving the multiple indications;
        predicting that the UE's second air-interface connection will be lost based at least in part on determining that the UE is approaching the drop zone, and
        responsive to at least the predicting that the UE's second air-interface connection will be lost, but before the predicted loss occurs, forgoing application of at least a portion of an uplink-path-switch control process for dynamically controlling whether to reconfigure the UE from having the first air-interface connection be set as the UE's primary uplink path to having the second air-interface connection be set as the UE's primary uplink path.

19. The first access node of claim 18, wherein the at least one controller comprises at least one processor, at least one non-transitory data storage, and program instructions stored in the at least one non-transitory data storage and executable by the at least one processor to cause the first access node to carry out the operations.

20. The first access node of claim 18,
wherein the uplink-path-switch control process comprises (i) monitoring to detect occurrence of an uplink-path-switch trigger for the reconfiguring of the UE from having the first air-interface connection be set as the UE's primary uplink path to having the second air-interface connection be set as the UE's primary uplink path and (ii) responsive to detecting occurrence of the uplink-path-switch trigger, reconfiguring the UE from having the first air-interface connection be set as the UE's primary uplink path to having the second air-interface connection be set as the UE's primary uplink path, and
wherein forgoing application of at least a portion of the uplink-path-switch control process for dynamically controlling whether to reconfigure the UE from having the first air-interface connection be set as the UE's primary uplink path to having the second air-interface connection be set as the UE's primary uplink path comprises at least one action selected from the group consisting of (i) discontinuing the monitoring and (ii) forgoing the reconfiguring even if the uplink-path-switch trigger occurs.

* * * * *